United States Patent [19]

Krohberger et al.

[11] 4,008,198
[45] Feb. 15, 1977

[54] PROCESS FOR PREPARING HIGHLY TRANSPARENT ELASTOMERS

[75] Inventors: Herbert Krohberger, Neuotting; Jürgen Burkhardt; Jörg Patzke, both of Burghausen, all of Germany

[73] Assignee: Wacker-Chemie GmbH, Munich, Germany

[22] Filed: May 2, 1975

[21] Appl. No.: 574,052

[30] Foreign Application Priority Data

May 15, 1974 Germany ............................ 2423531

[52] U.S. Cl. ...................... 260/37 SB; 260/46.5 G
[51] Int. Cl.² ......................................... C08L 83/04
[58] Field of Search .................. 260/46.5 G, 37 SB

[56] References Cited

UNITED STATES PATENTS

| | | | |
|---|---|---|---|
| 3,243,404 | 3/1966 | Martellock | 260/37 SB |
| 3,364,160 | 1/1968 | Golitz et al. | 260/46.5 G X |
| 3,428,599 | 2/1969 | Newing | 260/37 SB X |
| 3,642,685 | 2/1972 | Matherly | 260/37 SB |

Primary Examiner—Lewis T. Jacobs

[57] ABSTRACT

Highly transparent or optically clear elastomers are prepared by mixing (1) a nitrogen containing compound having at least one triorganosilyl group in which at least one nitrogen atom is linked either directly to a silicon atom or via an oxygen atom, but no more than one triorganosilyl group is linked to a nitrogen atom and no more than one condensable group is linked to a silicon atom, (2) a hexaorganodisilazane, (3) silicon dioxide having a surface area of at least 50 m²/g with (4) a highly viscous diorganopolysiloxane. The resulting composition may be cured by the addition of a curing agent to form highly transparent or optically clear elastomers.

20 Claims, No Drawings

PROCESS FOR PREPARING HIGHLY TRANSPARENT ELASTOMERS

The present invention relates to elastomers and more particularly to a process for preparing highly transparent or optically clear elastomers.

Compositions which may be cured to form highly transparent or optically clear elastomers have been described in French Pat. No. 1,453,327. These elastomers are prepared from highly viscous diorganopolysiloxanes and silicon dioxide having a surface area of at least 50 m$^2$/g. Compared to these compositions, the compositions prepared pursuant to this invention have several advantages. For example, these compositions can be stored prior to final molding without "structuring" or structure buildup even though the silicon dioxide having a surface area of at least 50 m$^2$/g has not been pretreated with organosilicon compounds prior to mixing with curable compositions. Thus, the process of this invention is highly desirable for the manufacture of so-called "non-milling compounds," i.e., mixtures which are marketed in the form of strips or pellets and which do not require a milling step prior to their further processing. Another advantage of the process of this invention is that the elastomers prepared from these compositions have improved resistance to tear when exposed to elevated temperatures as well as a low degree of residual pressure deformation ("compression set"). Moreover, the compositions of this invention are highly transparent and thus permit the manufacture of highly transparent elastomers even though the highly viscous diorganopolysiloxanes employed do not contain any phenyl groups. Furthermore, these compositions are optically clear and thus yield optically clear elastomers even when the highly viscous diorganopolysiloxanes employed in their preparation contain less phenyl groups than the diorganopolysiloxanes used heretofore in the preparation of optically clear curable elastomers. This has a further advantage since diorganopolysiloxanes free of phenyl groups or containing very few phenyl are readily available. Moreover, an increase in the Si-bonded phenyl groups causes the compositions to be sticky and thus makes further milling or extrusion more difficult. Thus, the process of this invention not only permits the use of more readily available diorganopolysiloxanes, but also facilitates the preparation of highly transparent or otically clear compositions which can be cured into highly transparent or optically clear elastomers. In addition, the compositions of this invention are more easily milled or extruded than the compositions known heretofore. Furthermore, in the process of this invention, elastomers can be prepared from highly viscous diorganopolysiloxanes which are free of phenyl groups or are substantially free of phenyl groups using smaller amounts of peroxide compounds than has been used heretofore in the preparation of highly transparent or optically clear elastomers from highly viscous diorganopolysiloxanes and high surface area silicon dioxide. Thus, the elastomrs prepared from the compositions of this invention contain fewer peroxide decomposition products than the compositions prepared heretofore, thereby increasing the elastomers' resistance to heat and also providing an elastomer having improved transparency. Another advantage of the compositions of this invention is that when they are extruded even from a shaping nozzle at a high rate of speed, their dimensions change less than is the case with the heretofore known compounds prepared from highly viscous diorganopolysiloxanes and high surface area silicon dioxide. The compositions prepared in accordance with this invention are more easily injection molded than the highly transparent or optically clear compositions known heretofore because they flow more easily and more uniformly from the storage cylinder into the injection cylinder.

Therefore, it is an object of this invention to provide a transparent or optically clear elastomer. Another object of this invention is to provide a composition that may be stored for long periods of time prior to final molding without structure buildup. Another object of this invention is to provide a highly transparent or optically clear elastomer that is substantially free of phenyl groups. Still another object of this invention is to provide a composition which has a low "compression set." A further object of this invention is to provide a composition which has improved resistance to tear. A still further object of this invention is to provide a process for preparing an elastomer having improved transparency.

The foregoing objects and others which will become apparent from the following description are accomplished in accordance with this invention, generally speaking, by providing a process for preparing highly transparent or optically clear elastomers by mixing (1) highly viscous diorganopolysiloxanes with (2) at least 0.02 percent by weight based on the weight of the highly viscous diorganopolysiloxanes of a nitrogen containing compound having at least one triorganosilyl group in which at least one nitrogen atom is linked either directly to a silicon atom or via an oxygen atom, but no more than one triorganosilyl group is linked directly to a nitrogen atom and no more than one condensable group is linked to a silicon atom, (3) from 4 to 40 percent by weight based on the weight of the highly viscous diorganopolysiloxanes of hexaorganodisilazane and (4) from 10 to 150 percent by weight based on the weight of the highly viscous diorganopolysiloxanes of a silicon dioxide having a surface of at least 50 m$^2$/g to form a homogenous composition and thereafter removing the volatile materials from the mixture prior to final shaping. The resulting composition may be cured by the addition of a curing agent to form highly transparent or optically clear elastomers.

The highly viscous diorganopolysiloxanes which may be employed in the process of this invention are well known in the art and have been used heretofore to form transparent or optically clear elastomers via the formation of free radicals or through the addition of silicon bonded hydrogen atoms to silicon bonded alkenyl groups. Moreover, the highly viscous diorganopolysiloxanes which are free of or contain fewer phenyl groups than those which have been used heretofore for the manufacture of highly transparent or optically clear elastomers may be used in the process of this invention.

The diorganopolysiloxanes which may be used in this invention may be represented by the general formula

wherein R which may be the same or different, represents monovalent hydrocarbon radicals or substituted hydrocarbon radicals, Z represents hydroxyl groups and/or alkoxy groups having from one to 18 carbon atoms, n is 0 or 1, preferably 0; and x is a number having a value which corresponds to a viscosity of at least 500,000 cSt at 25° C.

The diorganopolysiloxanes represented in the above formula may also contain siloxane units other than the diorganopolysiloxane units (SiR$_2$O) in the molecule. Examples of such other siloxane units which are present generally as impurities are those corresponding to the formulae RSiO$_{3/2}$, R$_3$SiO$_{1/2}$ and SiO$_{4/2}$, where R is the same as above. However, the amount of such other siloxane units should not exceed about 1 mol percent.

Examples of suitable hydrocarbon radicals represented by R are alkyl radicals such as methyl, ethyl, propyl, butyl, hexyl and octadecyl radicals; alkenyl radicals such as vinyl, allyl, ethylallyl and butadienyl radicals; aryl radicals such as the phenyl radical; alkaryl radicals such as the tolyl radical; and aralkyl radicals such as the beta-phenylethyl radical.

Examples of substituted hydrocarbon radicals represented by R are halogenated aliphatic hydrocarbon radicals such as the 3,3,3-trifluoropropyl radical and cyanalkyl radicals as well as the beta-cyanoethyl radical.

Because of their availability, it is preferable that at least a major proportion of the R radicals be methyl radicals. Other R radicals which may be present are preferably vinyl and/or phenyl radicals. It is preferred that no more than 5 silicon atoms and more preferably no more than 3 silicon atoms contain one or two phenyl radicals for each 100 silicon atoms in the highly viscous diorganopolysiloxanes.

When n has a value of 0 and the compounds are to be cured into elastomers through the addition of Si-bonded hydrogen atoms to Si-bonded alkenyl groups, it is preferred that at least 2 of the R radicals per molecule in the diorganopolysiloxanes be alkenyl radicals and more preferably that the terminal R radicals be alkenyl radicals, especially vinyl radicals.

The value of x is such that the viscosity of the diorganopolysiloxanes is preferably at least $10^6$ cSt at 25° C. or the plasticity of the diorganopolysiloxanes as determined by means of a Brabender plastograph has a factor of from 50 to 1,000 and more preferably of from 150 to 800.

Examples of suitable nitrogen compounds having at least one triorganosilyl group in which at least one nitrogen atom is linked either directly to a silicon atom or via an oxygen atom ($\equiv$Si-N$=$,$=$Si-O-N$=$, $\equiv$Si-O-N$=$CZ$=$), but no more than one triorganosilyl group is linked to a nitrogen atom and no more than one condensable group is linked to a silicon atom are:

a. aminosilanes such as those corresponding to the general formula R$_3$SiNR'$_2$ and (R$_3$SiNR')$_2$(CH$_2$)$_m$ where R is the same as above and R' is hydrogen or a monovalent hydrocarbon radical having from 1 to 10 carbon atoms and m is a whole number having a value of from 2 to 6;

b. acylaminosilanes such as those corresponding to the general formula

where R and R' are the same as above;

c. N-triorganosilylcarbamic acid esters such as those corresponding to the general formula R$_3$SiN-R'COOR where R and R' are the same as above;

d. N-triorganosiulylureas such a those corresponding to the general formulae

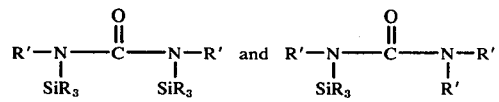

where R and R' are the same as above;

e. O-triorganosilyloxyamines corresponding to the general formula R$_3$Si-O-NR'$_2$ where R and R' are the same as above;

f. O-triorganosilylketoximes corresponding to the general formula R$_3$Si-O-N$=$CR''$_2$ where R is the same as above and R'' is hydrogen or a monovalent hydrocarbon radical having from 1 to 10 carbon atoms, except that when one R'' is hydrogen, the other R'' is a monovalent hydrocarbon radical or R''$_2$ can also represent a bivalent hydrocarbon radical;

g. aminoorganosiloxanes such as those corresponding to the general formula R$_3$Si(OSiR$_2$)$_p$NR'$_2$ where R and R' are the same as above and p is a whole number having a value of from 1 to 20; and h. triorganosilyloxy-N-triorganosilylamines of the general formula

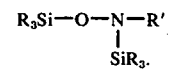

where R and R' are the same as above

All of the above mentioned types of nitrogen containing compounds having at least one triorganosilyl group in which at least one nitrogen atom is linked either directly to a silicon atom or via an oxygen atom, but no more than one triorganosily group is linked directly to a nitrogen atom and no more than one condensable group is linked to a silicon atom are well known in the art.

The above cited exmples of hydrocarbon radicals represented by R are equally applicable to hydrocarbon radicals represented by R' except for octadecyl radical. Also, the above mentioned examples of hydrocarbon radicals represented by R are equally applicable to hydrocarbon radicals represented by R'' except for the octadecyl radical. An additional example of a hydrocarbon radical represented by R' and R'' are the tert.-butyl radical. It is preferable that not more than one hydrogen atom represented by R' be linked to a nitrogen atom. Preferably hydrocarbon radicals represented by R and R' have from 1 to 4 carbon atoms.

Examples of aminosilanes (a) are diethylaminotrimethylsilane, diethylaminovinyldimethylsilane, N-propylaminotrimethylsilane and tert.-butylaminotrimethylsilane.

Examples of acylaminosilanes (b) are N-trimethylsilylacetamide and N-trimethylsilylformamide.

An example of N-triorganosilylcarbamic acid ester (c) is a compound corresponding to the formula

Examples of N-triorganosilylureas (d) are N,N'-dimethyl-N,N'-bis-(trimethylsilyl)-urea, N,N'-dimethyl-N'-trimethylsilylurea, N-methyl-N'-trimethylsilyl-N'-phenylurea and N-dimethyl-N'-trimethylsilyl-N'-phenylurea.

An example of O-triorganosilyoxyamines (e) is O-trimethylsilyloxydiethylamine.

In the process of this invention on the hydroxyl groups linked to the silicon atom in the highly viscous diorganopolysiloxane and/or the silicon dioxide having a surface area of at least 50 m²/g react with the nitrogen containing compounds having at least one triorganosilyl group in which at least one nitrogen atom is linked directly to silicon atom or via an oxygen atom, but no more than one triorganosilyl group is linked directly to a nitrogen atom and no more than one condensable group is linked to a silicon atom. Any unreacted nitrogen compounds described above as well as the low-molecular reaction products of the aforementioned reaction constitute a substantial portion of the volatile components which, pursuant to this invention, are removed prior to final molding. In order to facilitate the removal of these volatile components by heating, it is preferred that these nitrogen containing compounds which contain at least one triorganoxilyl group be of a type which have a boiling point below about 250° C. at 760 mm Hg (absolute). Likewise, the low-molecular weight reaction products which are generated during the reaction of these nitrogen containing compounds with the hydroxyl groups linked to the silicon atoms should have a boiling temperature below about 250° C. at 760 mm Hg (absolute).

If the high molecular weight diorganopolysiloxanes which are employed in the process of this invention have terminal triorganosiloxy units, then it is preferred that the triorganosilyl groups present in the nitrogen containing compounds have the same organic radicals as the triorganosilyl groups in the high molecular weight diorganopoly siloxanes. This, however, is by no means a necessary requirement.

It is preferred that the nitrogen containing compound containing at least one triorganosilyl group in which at least one nitrogen atom is linked either directly to a silicon atom or via an oxygen atom, but no more than one triorganosilyl group is linked directly to a nitrogen atom and no more than one condensable group is linked to a silicon atom, not exceed about 1 percent by weight based on the weight of the high viscosity diorganopolysiloxane. However, larger amounts may be employed since they can be removed as volatile materials before the curing agents are added. Although the compound may be employed in amounts greater than 1 percent by weight, it does not provide any particular advantage.

The hexaorganodisilazanes which are employed in the process of this invention can be represented by the general formula

in which R and R' are the same as above.

Preferably the hexaorganodisilazanes are hexamethyldisilazane and divinyltetramethyldisilazane.

Although there is no upper limit for the surface area of the silicon dioxide, it must have a surface area of at least 50 m²/g. Preferably the surface area is from 150 to 600 m²/g. (The surface area of the silicon dioxide is determined via nitrogen absorption which corresponds to ASTM Special Technical Bulleting No. 51, 1941, page 95 and following. This method is generally known as "BET".)Since it results in the production of highly transparent to optically clear elastomers, pyrogenically produced silicon dioxide (known as "fume silica") with a surface of at least 50 m²/g is preferred. Other examples of silicon dioxide having a surface area of at least 50 m²/g are silicic acid xerogels which have been dehydrated while maintaining their structure.

To facilitate mixing of the silicon dioxide having a surface area of at least 50 m²/g with the mixture containing the highly viscous diorganopolysiloxane, hexaorganodisilazane, and the other nitrogen containing compounds having at least one triorganosilyl group in which at least one nitrogen atom is linked either directly to a silicon atom or via an oxygen atom, but no more than one triorganoxilyl group is linked directly to a nitrogen atom and no more than one condensable group is linked to a silicon atom, the mixture can be mixed with from 1 to 40 percent by weight of water based on the weight of the highly viscous diorganopolysiloxane during or following the addition of the silicon dioxide. The addition of water is, however, by no means essential.

If desired, diorganosilandiols and/or diorganopolysiloxanols having the general formula HOSiR₂(OSiR₂)$_y$OH may be added to the composition. In the above formula R has the same meaning as above and is preferably an alkyl radical having from 1 to 1 carbon atoms and y is 0 or a number having a value of from 1 to 50. The silicon compounds indicated by the formula above may also contain siloxane units other than the diorganosiloxane units (SiR₂O). Examples of other siloxane units which may be present in the molecule are those corresponding to the formulae RSiO$_{3/2}$, R₃SiO$_{1/2}$ and SiO$_{4/2}$ where R is the same as above. The siloxane units, however, should not be present in an amount in excess of about one mol percent. Dimethylpolysiloxanes having a viscosity of from 30 to 40 cSt at 25° C. and which contain terminal hydroxyl groups are preferred. Moreover, it is preferred that the diorganosilandiols and/or diorganopolysiloxanols which have no more than about 50 diorganosiloxane units per molecule be employed in amounts of up to about 20 percent by weight based on the weight of the viscous diorganopolysiloxane.

In addition to the viscous diorganopolysiloxanes, fillers, curing agents and diorganosilandiols and/or diorganopolysiloxanols which are used in the production of the organopolysiloxane elastomers of this invention, other additives may be employed as long as they do not deteriorate the transparency or the optical clarity of the elastomers. Examples of suitable additives which do not effect the transparency of the elastomers are soluble dyes, ultraviolet light absorbers, cross-linking inhibitors such as benzotriazole which operate through the addition of silicon bonded hydrogen atoms to alkenyl groups and oxidation inhibitors.

The process of this invention can be carried out stepwise, as a semi-continuous or as a continuous process. Generally, it is carried out as a continuous process with the aid of kneading devices, especially twin-screw kneaders.

The pressures and temperatures employed in the process are not critical and may range from a temperature between 0 and 200° C. Although temperatures between about 20° and 120° C. are preferred because at these temperatures and at the prevailing pressures, the nitrogen containing compounds as well as the hexaorganodisilazanes are liquids.

Generally the volatile materials obtained from the homogeneous mixture consisting of the above compounds are removed by heating the mixxture preferably under reduced pressure prior to final molding. However, the volatile materials can be removed by extracting with solvents, via precipitation or via dialysis with the subsequent removal of the solvents.

The compositions prepared in accordance with this invention may be converted into elastomers in any manner known in the art for cross-linking diorganopolysiloxanes which contain terminal triorganosilyl groups. The preferred cross-linking technique employs organopolysiloxanes which have at least three silicon-bonded hydrogen atoms per molecule such as methyl hydrogen polysiloxanes in combination with catalysts which promote the addition of Si-bonded hydrogen to alkenyl groups. Examples of suitable catalysts which promote cross-linking are platinum catalysts such as those correponding to the formulae $PtCl_4$, $H_2PtCl_6$ and/or $(PtCl_2 \cdot C_2H_4)_2$. This type of cross-linking does not reduce the transparency or the optical clarity of the elastomers. However, in this type of cross-linking the viscous diorganopolysiloxanes must contain alkenyl groups at the time of cross-linking. The compounds produced in accordance with this invention may also be cured by the formation of free radicals. Examples of catalysts which generate free radicals are acylperoxides such as, for example, dibenzoylperoxide and bis-(2,4-dichlorobenzoyl)-peroxide; alkyl peroxides and arylperoxides such as di-tert.-butylperoxide, [2,5-bis(tert.-butylperoxy)-2,5-dimethylhexane] and dicumyl peroxide as well as so-called coperoxides or peroxide compounds with mixed substitution such as perketales and peresters, for example, diacetylperoxy dicarbonate and tert.-butylperbenzoate. Other free radical forming materials are the azo compounds such as azodiisobutyrodinitrile and high energy rays such a X-rays, alpha rays, beta rays or gamma rays.

The compounds prepared in accordance with this invention may be shaped prior to curing into elastomers by any suitable means known in the art for high viscosity diorganopolysiloxanes such as, for example, extruding, injection molding, injection pressing (sometinmes also referred to as "transfer pressing") or with the aid of press molds.

The compounds of this invention can be employed in the manufacture of contact lenses, gas masks, medical devices such as medical conduits or catheters, for encapsulating electrical components or electronic equipment as well as for the manufacture of any other objects which require highly transparent to optically clear organopolysiloxane elastomers.

In the following examples all parts are by weight unless otherwise specified.

EXAMPLE 1 a. 400 parts of a hydroxyl terminated diorganopolysiloxane which consists of 99.93 mol percent of dimethylsiloxane and 0.07 mol percent methylvinyl-siloxane units with a viscosity of 200 cSt at 25° C. and 0.8 part of a trimethylsilyl endblocked dimthylpolysiloxane which has 12 siloxane units per molecule are equilibrated in the presence of phosphornitrile chloride to form a trimethylsilyl endblocked diorganopolysiloxane having a viscosity of $10^6$ cSt at 25° C. About 200 parts of the highly viscous diorganopolysiloxane are mixed in a kneader with one part of tert.-butylaminotrimethylsilane, 20 parts of hexamethyldisilazane and 8 parts water and then with 100 parts of pyrogenically produced silicon dioxide which has a surface area of $300 \pm 25$ m$^2$/g. When the mixture becomes homogeneous, it is kneaded at 150° C. and at 1 mm Hg (abs) until there is no evidence of nitrogen compounds being evolved.

b. For purposes of comparison, Example 1 (a) is repeated except that the tert.-butylaminotrimethylsilane is omitted.

c. For purposes of comparison, Example 1 (a) is repeated except that 20 parts of a hydroxyl teminated dimethylpolysiloxane which has a viscosity of 40 cSt at 25° C. is substituted for the hexamethyldisilazane.

The light transparency of the compositions is determined in accordance with the procedure described in DIN No. 5033, page 7.

The change in dimensions of the compositions after molding is determined in the following manner:

In each case, 100 grams of the compound being tested are rolled on a laboratory mill having a distance between the rollers of 2 mm and then molded into a roll. The roll is then passed once more through the mill while the distance between the rollers is increased to 3 mm. The "sheet" thus obtained is powdered with talcum powder and placed on a smooth surface for 15 minutes. The thickness (d) of the so-called "sheet" is then measured and the change (Q%) is calculated according to the following equation:

$$Q\% = \frac{d-3}{3} \cdot 100$$

The results are illustrated on the following Table.

| Example No. | Change in dimensions Q% | Light transparency % |
|---|---|---|
| 1(a) | 40 | 91 |
| 1(b) | 220 | not determined |
| 1(c) | not determined | 84 |

These results show that the change in the dimensions of the compositions after molding is extremely high unless the composition contains both a hexaorganodisilazane and a nitrogen containing compound having at least one triorganosilyl group in which at least one nitrogen atom is linked either directly to a silicon atom or via an oxygen atom, but no more than one triorganosilyl group is linked to a nitrogen atom and no more than one condensable group is linked to a silicon atom. Moreover these Examples show that when the hexaorganodisilazane is omitted from the composition, the light transparency of the elastomer decreases.

EXAMPLE 2

The procedure described in Example 1(a) is repeated except that 17 parts of a hydroxyl terminated dimethylpolysiloxane having a viscosity of 40 cSt at 25° C. is added.

The light transparency and the change in dimensions of the resulting composition were determined in accordance with the procedure described above. The results of these tests are illustrated below.

| Change in dimensions Q% | Light transparency % |
|---|---|
| 30 | 90 |

EXAMPLE 3

The procedure described in Example 1(a) is repeated except that 1 part of 0-trimethylsilyloxydiethylamine is substituted for the tert.-butylaminotrimethylsilane. The change in dimensions and the transparency of the resulting compositions are illustrated below.

| Change in dimensions (Q%) | 50 |
|---|---|
| Light transparency (%) | 90 |

EXAMPLE 4 a. The procedure described in Example 1(a) is repeated except that 200 parts of a highly viscous diorganopolysiloxane having a viscosity of $10^6$ cSt at 25° C. is substituted for the diorganopolysiloxane used in Example 1. The diorganopolysiloxane used in this example was prepared by equilibrating 400 parts of a hydroxyl terminated diorganopolysiloxane containing 94.0 mol percent dimethylsiloxane, 5.5 mol percent diphenylsiloxane and 0.5 mol percent methylvinylsiloxane units and 0.8 part of a trimethylsilyl endblocked dimethylpolysiloxane having 12 siloxane units per molecule in the presence of phosphornitrile chloride.

b. The procedure described under Example 4(a) above is repeated except that for comparison purposes, tert.-butylaminomethylsilane is omitted.

c. The procedure described under Example 4(a) above is repeated except that for comparison purposes, hexamethyldisilazane is omitted.

The change in dimensions and the light transparency of the resulting compositions are determined in accordance with the procedure described above. The results are illustrated in the following Table.

| Example No. | Change in dimensions Q% | Light transparency % |
|---|---|---|
| 4(a) | 35 | 96 |
| 4(b) | 190 | not determined |
| 4(c) | not determined | 92 |

Although specific examples of the invention have been described herein, it is not intended to limit the invention solely thereto, but to include all variations and modifications falling within the spirit and scope of the appended claims.

What is claimed is:

1. A composition which is convertible to highly transparent or optically clear elastomers comprising (1) an organopolysiloxane having a viscosity of at least 500,000 cSt at 25° C., (2) at least 0.02 percent by weight based on the weight of the organopolysiloxane (1) of a nitrogen containing compound selected from the class consisting of N-triorganosilylcarbamic acid esters, N-triorganosilylureas, O-triorganosilyloxyamines, aminoorganosiloxanes and triorganosilyloxy-N-triorganosilylamines, (3) from 4 to 40 percent by weight based on the weight of the organopolysiloxane (1) of a hexaorganodisilazane and (4) from 10 to 150 percent by weight based on the weight of the organopolysiloxane (1) of silicon dioxide having a surface area of at least 50 m²/g.

2. The composition of claim 1 wherein the N-triorganosilycarbamic acid esters are represented by the formula

R₃SiNR'COOR where R is selected from the group consisting of monovalent hydrocarbon radicals, halogenated aliphatic hydrocarbon radicals and cyanoalkyl radicals and R' is selected from the group consisting of hydrogen and monovalent hydrocarbon radicals having from 1 to 10 carbon atoms.

3. The composition of claim 1 wherein the N-triorganosilylureas are selected from the class consisting of

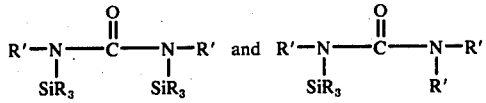

where R is selected from the group consisting of monovalent hydrocarbon radicals, halogenated aliphatic hydrocarbon radicals and cyanoalkyl radicals and R' is selected from the group consisting of hydrogen and monovalent hydrocarbon radicals having from 1 to 10 carbon atoms.

4. The composition of claim 1 wherein the O-triorganosilyloxyamines are represented by the formula

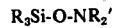
R₃Si-O-NR₂' where R is selected from the group consisting of monovalent hydrocarbon radicals, halogenated aliphatic hydrocarbon radicals and cyanoalkyl radicals and R' is selected from the group consisting of hydrogen and monovalent hydrocarbon radicals having from 1 to 10 carbon atoms.

5. The composition of claim 1 wherein the O-triorganosilylketoximes are represented by the formula

3Si-O-N=CR₂'' where R is selected from the group consisting of monovalent hydrocarbon radicals, halogenated aliphatic hydrocarbon radicals and cyanoalkyl radicals and R'' is selected from the group consisting of hydrogen, monovalent hydrocarbon radicals having from 1 to 10 carbon atoms except that when one R'' is hydrogen, the other R'' is a monovalent hydrocarbon radical or R₂'' is a bivalent hydrocarbon radical.

6. The composition of claim 1 wherein the aminoorganosiloxanes are represented by the formula

R₃Si(OSiR₂)ₚNR'₂ where R is selected from the group consisting of monovalent hydrocarbon radicals, halogenated aliphatic hydrocarbon radicals and cyanoalkyl radicals, R' is selected from the group consisting of hydrogen and monovalent hydrocarbon radicals having from 1 to 10 carbon atoms and p is a whole number having a value of from 1 to 20.

7. The composition of claim 1 wherein the triorganosilyloxy-N-triorganosilylamines are represented by the formula

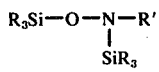

where R is selected from the group consisting of monovalent hydrocarbon radicals, halogenated aliphatic hydrocarbon radicals and cyanoalkyl radicals and R' is selected from the group consisting of hydrogen and monovalent hydrocarbon radicals having from 1 to 10 carbon atoms.

8. A method for preparing a composition which is convertible to highly transparent or optically clear elastomers which comprises mixing (1) an organopolysiloxane having a viscosity of at least 500,000 cSt at 25° C. with (2) at least 0.02 percent by weight based on the weight of the organopolysiloxane (1) of a nitrogen containing compound having at least one triorganosily group in which at least one nitrogen atom is linked directly to a silicon atom or via an oxygen atom, but no more than one triorganosily group is linked to a nitrogen atom and no more than one condensable group is linked to a silicon atom, (3) from 4 to 40 percent by weight based on the weight of the organopolysiloxane (1) of a hexaroganodisilazane and (4) from 10 to 150 percent by weight based on the weight of the organopolysiloxane (1) of silicon dioxide having a surface area of at least 50 m²/g, and thereafter removing the volatile materials at an elevated temperature prior to final molding.

9. The method of claim 8 wherein the nitrogen containing compound (2) has a boiling point up to 250° C. at 760 mm Hg (absolute).

10. The method of claim 8 wherein the composition containing (1) an organopolysiloxane having a viscosity of at least 500,000 cSt at 25° C., (2) at least 0.02 percent by weight based on the weight of the organopolysiloxane (1) of a nitrogen containing compound having at least one triorganosilyl group in which at least one nitrogen atom is linked directly to a silicon atom or via an oxygen atom, but no more than one triorganosily group is linked to a silicon atom and no more than one condensable group is linked to a silicon atom and (3) from 4 to 40 percent by weight based on the weight of the diorganopolysiloxane (1) of a hexaorganodisilazane is mixed with from 1 to 40 percent by weight of water based on the weight of the organopolysiloxane (1) simultaneously with the addition of the silicon dioxide having a surface area of at least 50 m²/g.

11. The method of claim 8 wherein the composition containing (1) an organopolysiloxane having a viscosity of at least 500,000 cSt at 25° C., (2) at least 0.02 percent by weight based on the weight of the organopolysiloxane (1) of a nitrogen containing compound having at least one triorganosily group in which at least one nitrogen atom is linked directly to a silicon atom or via an oxygen atom, but no more than one triorganosilyl group is linked to a nitrogen atom and no more than one condensable group is linked to a silicon atom, (3) from 4 to 40 percent by weight based on the weight of the organopolysiloxane (1) of a hexaorganodisilazane and (4) from 10 to 150 percent by weight based on the weight of the organopolysiloxane (1) of silicon dioxide having a surface area of at least 50 m²/g is mixed with from 1 to 40 percent by weight of water based on the weight of the organopolysiloxane (1).

12. The method of claim 8 wherein a silicon compound of the formula $$HOSiR_2(OSiR_2)_yOH$$

in which R is selected from the group consisting of monovalent hydrocarbon radicals, halogenated aliphatic hydrocarbon radicals and cyanoalkyl radicals and y is a number of from 0 to 50 is mixed with the composition.

13. The method of claim 8 wherein the nitrogen containing compound (2) is an aminosilane selected from the class consisting of

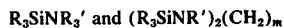

where R is selected from the group consisting of monovalent hydrocarbon radicals, halogenated aliphatic hydrocarbon radicals and cyanolkyl radicals, R' is selected from the group consisting of hydrogen and monovalent hydrocarbon radicals having from 1 to 10 carbon atoms and m is a number of from 2 to 6.

14. The method of claim 8 wherein the nitrogen containing compound (2) is an acylaminosilane of the formula

where R is selected from the group consisting of monovalent hydrocarbon radicals, halogenatd aliphatic hydrocarbon radicals and cyanoalkyl radicals and R' is selected from the group consisting of hydrogen and monovalent hydrocarbon radicals having from 1 to 10 carbon atoms.

15. The method of claim 8 wherein the nitrogen containing compound (2) is an N-triorganosilylcarbamic acid ester of the formula $$R_3SiNR'COOR$$

where R is selected from the group consisting of monovalent hydrocarbon radicals, halogenated aliphatic hydrocarbon radicals and cyanoalkyl radicals and R' is selected from the group consisting of hydrogen and monovalent hydrocarbon radicals having from 1 to 10 carbon atoms.

16. The method of claim 8 wherein the nitrogen containing compound (2) is N-triorganosilyurea which is selected from the class consisting of

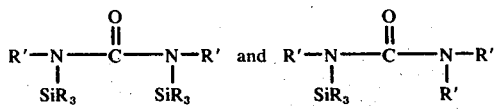

where R is selected from the group consisting of monovalent hydrocarbon radicals, halogenated aliphatic hydrocarbon radicals and cyanoalkyl radicals and R' is selected from the group consisting of hydrogen and monovalent hydrocarbon radicals having from 1 to 10 carbon atoms.

17. The method of claim 8 wherein the nitrogen containing compound (2) is an O-triorganosilylamine of the formula $$R_3Si-O-NR'_2$$

where R is selected from the group consisting of monovalent hydrocarbon radicals, halogenated aliphatic hydrocarbon radicals and cyanoalkyl radicals and R' is selected from the group consisting of hydrogen and monovalent hydrocarbon radicals having from 1 to 10 carbon atoms.

18. the method of claim 8 wherein the nitrogen containing compound (2) is an O-triorganosilylketoxime of the formula $$R_3Si-O-N=CR''_2$$

where R is selected from the group consisting of monovalent hydrocarbon radicals, halogenated aliphatic hydrocarbon radicals and cyanoalkyl radicals and R'' is selected from the group consisting of hydrogen, monovalent hydrocarbon radicals having from 1 to 10 carbon atoms, except that when one R'' is hydrogen, the other R'' is a monovalent hydrocarbon radical or $R_2''$ is a bivalent hydrocarbon radical.

19. The method of claim 8 wherein the nitrogen containing compound (2) is an aminoorganosiloxane of the formula $$R_3Si(OSiR_2)_pNR_2'$$

where R is selected from the group consisting of monovalent hydrocarbon radicals, halogenated aliphatic hydrocarbon radicals and cyanoalkyl radicals, R' is selected from the group consisting of hydrogen and monovalent hydrocarbon radicals having from 1 to 10 carbon atoms and p is a whole number having a value of from 1 to 20.

20. The method of claim 8 wherein the nitrogen containing compound (2) is a triorganosilyloxy-N-triorganosilylamine of the formula $$R_3Si-O-N-R'$$
$$\quad\quad\quad\quad |$$
$$\quad\quad\quad\quad SiR_3$$

where R is selected from the group consisting of monovalent hydrocarbon radicals, halogenated aliphatic hydrocarbon radicals and cyanoalkyl radicals and R' is selected from the group consisting of hydrogen and monovalent hydrocarbon radicals having from 1 to 10 carbon atoms.

* * * * *